Dec. 27, 1938. C. RAVUT ET AL 2,141,553
TRANSMISSION CONTROL CIRCUIT
Filed Sept. 29, 1936 4 Sheets-Sheet 1
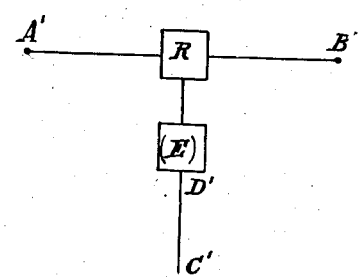
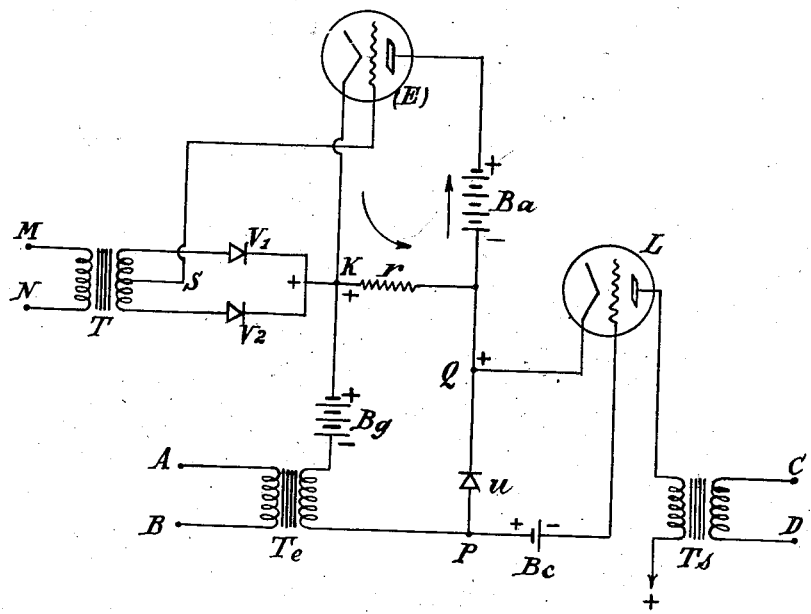

Dec. 27, 1938.　　　C. RAVUT ET AL　　　2,141,553
TRANSMISSION CONTROL CIRCUIT
Filed Sept. 29, 1936　　　4 Sheets-Sheet 3
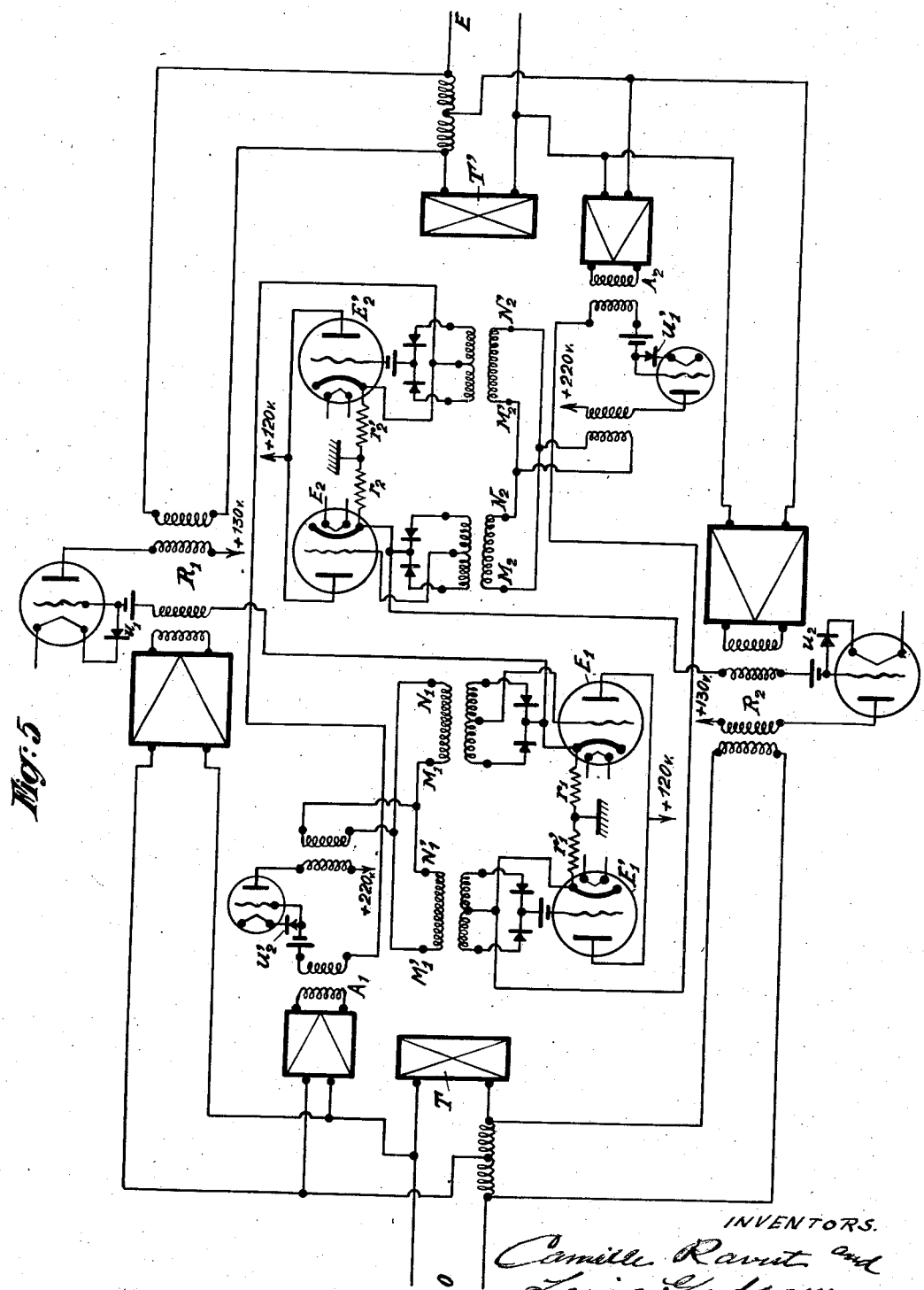
INVENTORS.
Camille Ravut and
Louis Godraw.
By Watson, Coit, Morse & Grindle
ATTYS.

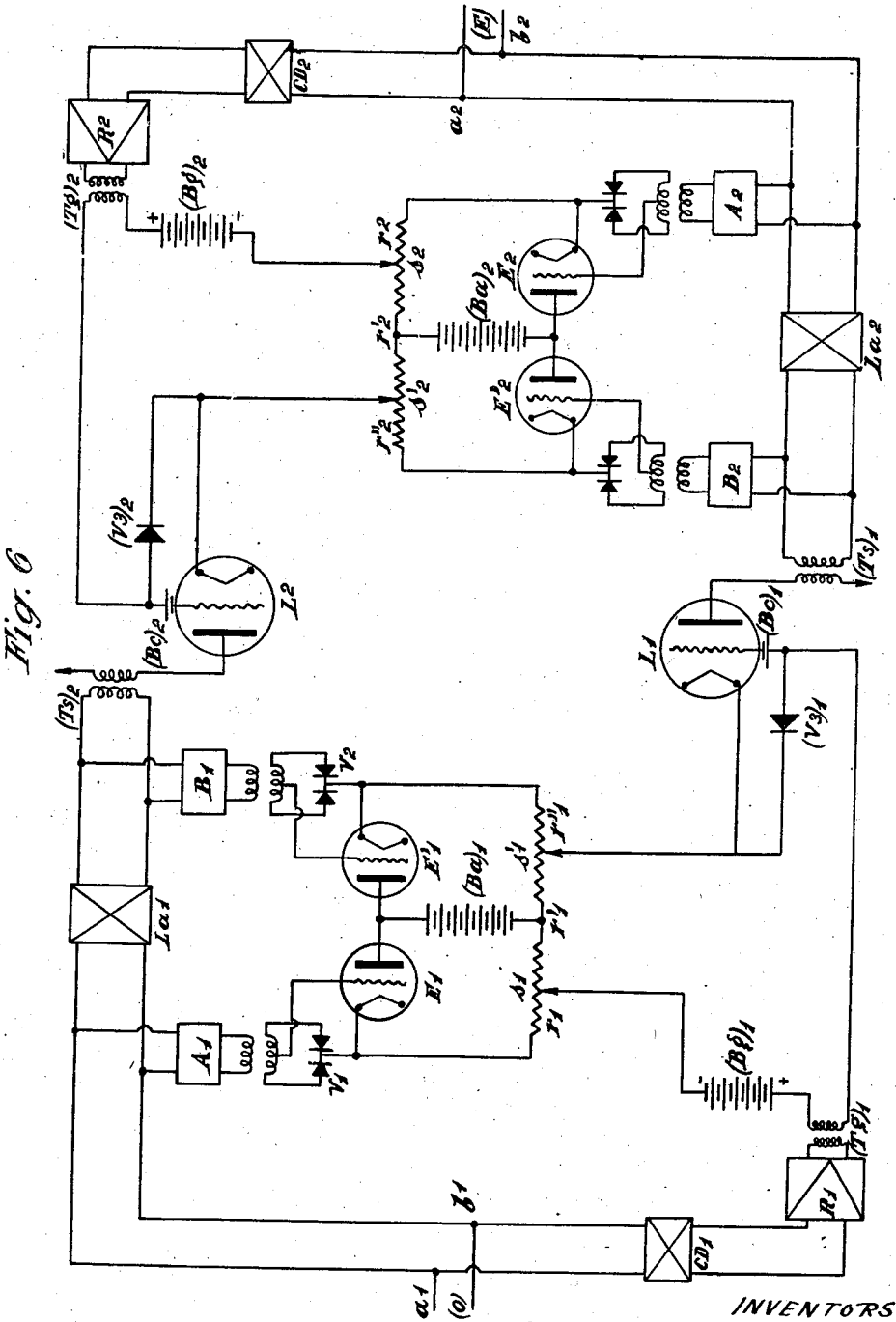

Patented Dec. 27, 1938

2,141,553

UNITED STATES PATENT OFFICE 2,141,553

TRANSMISSION CONTROL CIRCUIT

Camille Ravut and Louis Godeau, Paris, France, assignors to Societe Industrielle des Telephones (Constructions Electriques, Caoutchouc, Câbles), Paris, France, a company of France Application September 29, 1936, Serial No. 103,192
In France October 8, 1935

8 Claims. (Cl. 178—44)

The present invention concerns a device for modifying the action of an electric transformer through the medium of controlling alternating tensions.

According to the invention, we insert, in the circuit of the secondary of the transformer, a unidirectional conduction system (such for instance as a rectifier) and also a source of continuous potential the poles of which are so arranged, with respect to the unidirectional conduction system, that this source can produce a current through said system, this source being brought into or out of action by the existence or the absence of the alternating control potential. Preferably, this potential is rectified and transformed into a continuous potential applied to the grid circuit of a thermionic tube, whereby the anode circuit of this tube is blocked or released, according as the alternating control tension is working or not. This anode circuit includes a resistance inserted in the circuit of the secondary of the transformer and which constitutes the source of continuous potential that feeds current through the unidirectional conduction system.

This device is especially interesting for the control of the amplification of a thermionic amplifier, because it permits of reducing to zero, or even of rendering negative (weakening) the amplification obtained with such an apparatus, and this merely through the action of the alternating control current. In this application of the invention, the continuous source is inserted in series in the circuit of the secondary of the amplifier transformer (input transformer) which circuit includes, in the known manner, the control grid and the cathode of the first tube. The unidirectional conduction system is inserted in parallel with the secondary and a grid polarization battery may be added to the circuit of the latter, this battery being mounted in opposition with the continuous source and having an electromotive force lower than that of the latter.

Other features of the present invention will result from the following detailed description of some specific embodiments thereof.

Preferred embodiments of the present invention will be hereinafter described with reference to the accompanying drawings, given merely by way of example, and in which:

Fig. 1 is a diagrammatical view illustrating the principle of the device according to the invention in its application to the control of an electric amplifier;

Fig. 2 diagrammatically shows an embodiment of this device;

Figs. 4 and 5 are diagrams relating to the application of the device to telephonic transmission circuits with a view to eliminating the phenomenon called "singing";

Fig. 6 is a diagrammatical view of a repeater for two-wire telephonic lines according to the invention.

Figure 4:
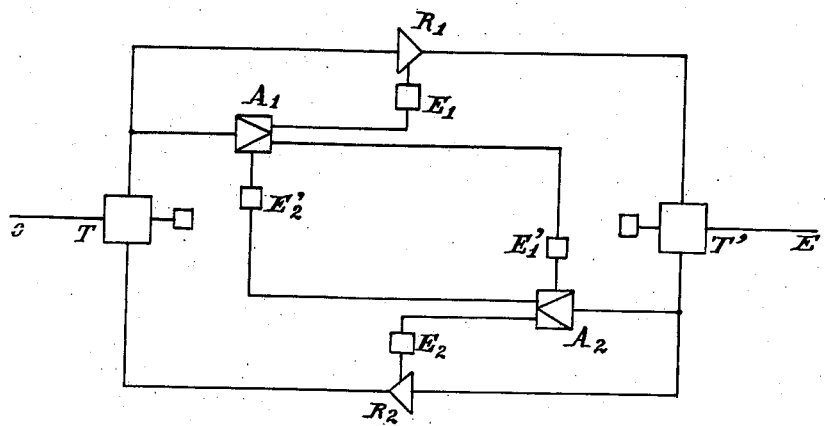

In Fig. 1, A'B' is a transmission circuit (telephonic line for instance) in which there is inserted an amplifying relay R including multi-electrode tubes.

C'D' is a circuit receiving the alternating control potential and in which is placed the particular device E according to the invention, as it will be hereinafter described.

This device E, fed with current by C'D', is connected to the amplifier the amplification of which is to be modified.

It acts in either of the following manners, according to the application that is considered:

(a) The absence of control current in circuit C'D' prevents any transmission through circuit A'B', such a transmission being possible only when the control current is flowing through circuit C'D'.

(b) The absence of control current in circuit C'D' permits any transmission through circuit A'B', such a transmission being prevented when the control current is flowing through circuit C'D'.

This control device is based upon the utilization of the two following phenomena:

1. The ratio of the potentials of a potential transformer decreases very quickly when the working impedance of its secondary winding, that is to say the impedance of its circuit, decreases: in particular if this winding is short-circuited the ratio of the potentials becomes zero.

2. A unidirectional conduction system, such as a dry contact rectifier, inserted in series in a circuit including a source of continuous potential and a source of alternating potential, acts, in connection with the latter, like a potentiometer capable of supplying an alternating difference of potential the value of which varies as a function of the direction of the polarities and of the value of the potential of the continuous source. When the continuous potential is such that the continuous current can flow in the direction in which the impedance of the unidirectional conduction system is low, the alternating difference of potential received at the terminals of this system is small.

When the continuous potential is such that the continuous or direct current flows in the direction in which the impedance of the unidirectional conduction system is very high, the alternating difference of potential collected at the terminals of the system is that of the source producing the alternating potential less the drop of potential due to the impedances of the circuit that is considered.

Fig. 2 shows an embodiment of a control device the working of which is based upon the combination of the two principles above mentioned.

In this figure, L is a multi-electrode electron tube amplifying the transmission in a circuit the input terminals of which are A and B.

The output terminals are C and D. Reference characters Te and Ts designate the input and output transformers of the amplifying system, respectively.

In series with the secondary of the input transformer, the following elements are connected:
(a) A resistance $r$,
(b) A polarization battery Bg,
(c) A unidirectional conduction system $u$ (for instance a dry rectifier), inserted between terminals P and Q in such manner that it opposes the passage of the current of the polarization battery.

The grid circuit of tube L is connected to the terminals P and Q of the unidirectional conduction system.

Bc is a second polarization battery, which serves to complete the polarization of Bg in order that the amplifying tube may work at a suitable point of its characteristic curve.

The alternating control tension is applied upon the terminals M and N of a transformer the secondary of which includes two rectifying valves $V^1$ and $V^2$ connected in such manner that both alternations of the potential applied at M and N are rectified. This rectified potential polarizes the grid of a multi-electrode valve E the plate circuit of which passes through resistance $r$, which is also inserted, as above stated, in the grid circuit of tube L.

Variations of the alternating control potential at MN produce corresponding variations of the plate current of the tube E and therefore variations of the difference of potential existing at the ends of resistance $r$.

As this difference of potential is in opposition with the potential of the polarization battery Bg, it is possible, by suitably adjusting the control potential applied at MN, to vary the direction and the value of the continuous potential at the ends of resistance $r$ that results from the positive or negative difference between the potential supplied by tube E and that produced by source Bg. This resultant potential is in series with the unidirectional conduction system $u$, which thus plays the part of grid potentiometer of valve L. It follows that the amplification produced by this tube is modified when the alternating potential applied at MN varies.

In the case of Fig. 2, when the potential at MN is zero, the difference of potential produced at the ends of $r$ by the current battery Ba in the plate circuit of tube E is maximum and higher than the electromotive force of Bg.

In view of the direction of the polarities of this difference of potential (opposed to that of source Bg), it will produce a current in the circuit including: source Bg, the secondary of transformer Te and system $u$, which is arranged, for this current, in the direction in which its resistance is very low.

The two phenomena above referred to are therefore simultaneously brought into play, owing to the working impedance of the secondary of Te and to the circulation of current from the continuous source, corresponding to resistance $r$, across system $u$. The transmission to the grid circuit of tube L of the alternating potentials to be amplified fed at AB is therefore considerably reduced or even reduced to zero and the amplification of tube L is zero or negative.

It is possible to modify the diagram of Fig. 2 and to obtain, on the contrary, a positive amplification of tube L, when the potential at MN is equal to zero. It suffices for this purpose suitably to polarize valve E and to reverse the terminals K and S of the control rectifier.

Figure 3:
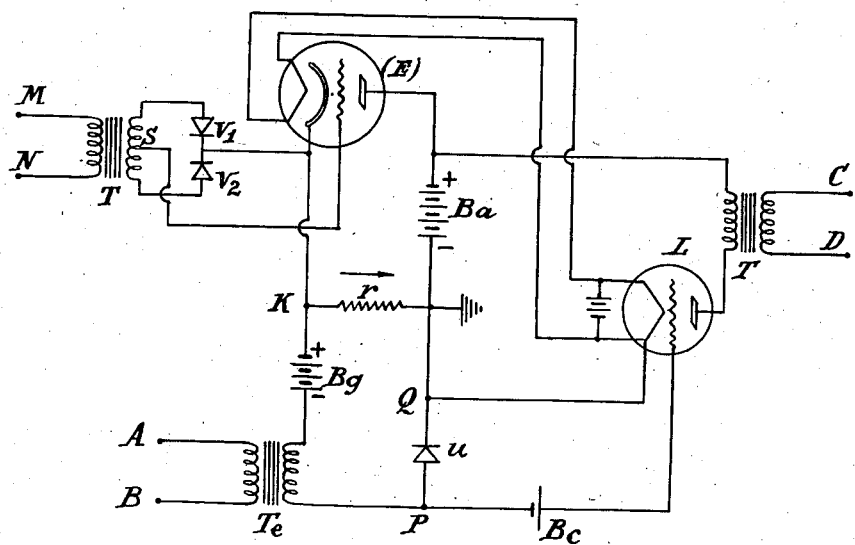
Fig. 3 shows a modification of the device of Fig. 2.

Fig. 3 shows a modification of the device of Fig. 2, embodying feed batteries common to the various circuits. In this figure, the same reference characters designate the same elements as in Fig. 2.

We will now describe a particular application of the invention to telephonic transmissions.

It is a well known fact that, with telephonic repeaters of the standard type for lines including two wires, considerable difficulties result from the difference existing between the value of the impedance of the line utilized by the repeater and the impedance of the balancing system, which consists of artificial lines reproducing as well as possible the impedance of the line in service.

When such a difference or unbalance exists, the amplified telephonic current is divided into two parts:
(a) One of these parts flows through the telephonic line;
(b) The other part flows through the repeater. The intensity of this current is a function of the degree of unbalance above referred to.

If the amplification of the repeater is low with respect to the degree of unbalance of the line and the balancing system, this circulating current is quickly weakened and it has no influence upon the good working of the repeater.

On the contrary, if the amplification of the repeater is very great with respect to the degree of unbalance of the line with respect to the balancing system, the circulation current increases by passing through the amplifying valves of the repeater and undamped oscillations are produced interfering with the conversation of the subscribers. It is then said that the repeater "sings".

The present invention permits of obviating this drawback.

It is clear that if the circulation current due to the unbalance between the line and the balancing system meets across its path with a weakening system instead of an amplifying system, the phenomenon called "singing" will be attenuated or even wholly eliminated.

Now the principle of the present invention affords the possibility of reducing to zero, or even rendering negative, the amplification of the amplifier of that of the two subscribers who are listening, which amplifier is located across the path of the circulation current, while exerting no action whatever upon the amplifier of the subscriber who is talking.

When one of the subscribers stops talking, the amplifier of the other subscriber, who is now going to answer, must be released, while, at the same time, the amplifier of the first mentioned subscriber must be blocked.

These various operations of blocking and releasing the amplifiers may be performed by the subscribers themselves, or, in other words, by the telephonic currents produced by the conversation of said subscribers.

Another possibility resulting from the present invention consists in reducing to zero or rendering negative the amplification of the amplifier through the mere action of the telephonic currents due to the conversation of the subscribers.

The calling subscriber, when talking, releases his amplifier and blocks the amplifier of the other subscriber, called by him.

On the contrary, when this second mentioned subscriber is talking, the amplifier of the calling subscriber is blocked and the amplifier of said second mentioned subscriber is released.

To sum up, the present invention permits of modifying, reducing to zero, or again rendering negative, the amplification of an amplifier of the multi-electrode valve type for telephonic repeaters, and this under the mere action of conversation alternating currents.

This device, in addition to its application to the control of the amplifiers of repeaters, can also be utilized whenever it is desired to modify from a distance the amplification of a valve amplifier of any type. In this case, the control current is not necessarily a telephonic current. It may consist of alternating current from a distribution system or an alternator.

By way of example, Fig. 4 shows an application of the system above described to telephonic transmission with a view to reducing the reactions that may occur in two-wire circuits. The whole of O, T, $R_1$, $R_2$, T', E represents the usual arrangement of a system of repeating relays for two-wire circuits.

$R_1$ is the repeater corresponding to direction OE, $R_2$ being the repeater corresponding to direction EO;

T and T' are the usual balancing systems;

$E_1$, $E_2$, $E'_1$, and $E'_2$ are devices according to the invention.

The alternating potentials that control these devices (potentials received at the terminals M, N, of transformer T in the embodiment of Fig. 1) are supplied by amplifier $A_1$ for devices $E_1$, $E'_1$, and by a second amplifier $A_2$ for devices $E_2$, $E'_2$. Amplifier $A_1$ is controlled by the conversation currents of direction OE whereas amplifier $A_2$ is controlled by the conversation currents of opposed direction EO. Devices $E_1$ and $E_2$ are of the first type above described, that is to say they permit the operation of the respective repeaters $R_1$, $R_2$ when they have brought about an alternating control potential through the corresponding amplifier $A_1$ or $A_2$. Devices $E'_1$ and $E'_2$ which control amplifiers $A_2$ $A_1$ are of the inverse type, that is to say they reduce to zero or render negative the action of the controlled amplifier $A_2$ or $A_1$ when they receive a control potential from their respective feed amplifier $A_1$ or $A_2$.

The operation of the device is the following:

In the state of rest, when no conversation is taking place, $E_1$ and $E_2$ reduce to zero the amplifications of repeating relays $R_1$ and $R_2$.

$E'_1$ permits the operation of amplifier $A_2$; in a likewise manner $E'_2$ permits the operation of $A_1$.

When a conversation is taking place in direction OE, the control devices act in the following order:

(a) $E'_1$ blocks amplifier $A_2$.

(b) $E_1$ releases repeater $R_1$.

(c) $E_2$ and $E'_2$ do not receive a controlling potential from amplifier $A_2$.

For direction EO:

(a) $E'_2$ blocks $A_1$;

(b) $E_2$ releases $R_2$;

(c) $E_1$ and $E'_1$ are not controlled by amplifier $A_1$.

Fig. 5 shows a detailed diagram of the stabilizing device the working principle of which has been just above described.

In this figure of the drawings, the same reference characters designate the same elements as in Fig. 4.

An analogous arrangement would permit of obtaining an anti-echo effect in four-wire transmissions.

The invention also permits of devising an amplifying relay eliminating the phenomenon called "singing" as above referred to.

This relay includes, as above stated, two thermionic tube amplifiers corresponding respectively to each of the directions of communication and control means for these amplifiers ensuring the normal working of the amplifier for the desired direction of communication (in the case of a telephonic system the amplifier opens the way to the person that is talking) but reducing the amplification of the other amplifier to zero.

These control means are operated by the transmission currents sent through the line, for instance conversation currents.

The repeater which will now be more specifically described is based upon the use of the following phenomenon, taken in combination with those above stated with reference to the preceding embodiments:

Considering a passive electric system with four terminals constituted by any combination of impedances and inserted in a transmission line, there exists a difference of potential between the input terminals and the output terminals of this system.

In the embodiment of Fig. 6, the conversation current from the subscriber connected at O, for instance, is divided into two portions:

(a) A first portion, after passing through a counter-deformation device $CD_1$ of a well known type, acts upon amplifier $R_1$ (the counterdeformation device may be located at another place or even dispensed with without modifying anything to the operation of the whole system);

(b) The second portion passes through a passive system $La_1$ the characteristics of which depend upon those of the line connected at $a_1b_1$ and which is mounted on the secondary of the output transformers $TS_2$ of amplifier $R_2$ of which $L_2$ is one of the tubes (the final tube in the embodiment illustrated by the drawings).

On either side of this system $La_1$ are connected two rectifiers $V_1$, $V_2$, for instance through the medium of two amplifiers $A_1$ and $B_1$. These rectifiers can modify the grid potentials of two multi-electrode valves $E_1$ and $E'_1$. The latter feed current to potentiometric resistances $r_1r'_1$ and $r'_1r''_1$. Resistances $r_1r'_1$ and $r'_1r''_1$ are also included in the grid circuit of one of the tubes $L_1$ of amplifier $R_1$. The secondary of the transformer $Tg_1$ for the coupling of tube $L_1$ with the preceding valve of amplifier $R_1$ is connected in series with a unidirectional conduction system $(V_3)_1$ (for instance a rectifier), a polarization battery $(Bg)_1$ and resistances $r_1r'_1$ and $r'_1r''_1$.

The output of amplifier $R_1$ is connected to the transmission line through transformer $(Ts)_1$ and system $(La)_2$ analogous to system $(La)_1$.

The telephonic currents coming from subscriber E follow an identical path, through system $(La)_2$, amplifier $R_2$ and system $(La)_1$.

When subscriber O is talking, the voltage level is higher at $A_1$ than at $B_1$ due to the presence of system $(La)_1$. The amplifiers $A_1$ $B_1$, the transformers, and, in a general manner the elements present in the various circuits of valves $E_1$ $E'_1$ are so dimensioned that the current in $r_1r'_1$ is more intensive than the current in $r'_1r''_1$. $r_1r'_1$ and $r'_1r''_1$ are identical. $s_1s'_1$ are two symmetrical points chosen one on $r_1r'_1$, and the other on $r'_1r''_1$. These points are adjustable and such that the potential of $s_1$ is higher than that of $s'_1$ when subscriber O is talking.

In the absence of a conversation, battery $(Bg)_1$ polarizes the grid of tube $L_1$ in such manner that the amplifying power thereof is zero (blocking). When subscriber O is talking, the resultant potential between $s_1$ and $s'_1$, opposes the electromotive force of $(Bg)_1$, which serves to release amplifier $R_1$, as above explained.

The conversation current of subscriber O, after amplification in $R_1$, passes to the amplifiers $B_2$ and $A_2$. But, due to the presence of system $(La)_2$, the level is higher at $B_2$ than at $A_2$.

Amplifiers $A_2$, $B_2$, valves $E_2$, $E'_2$ and the elements present in their various circuits are analogous to the corresponding elements controlled by amplifiers $A_1$, $B_1$ and arranged in the same manner. It follows that the current intensity in $r''_2r_2$ is higher than in $r'_2r_2$ ($s'_2s_2$ are two points analogous to points $s_1s'_1$ symmetrical and adjustable in such manner that the potential of $s'_2$ is higher than the potential of $s_2$).

The resultant potential between $s'_2$ and $s_2$ opposes the electromotive force of $(Bg)_2$, which has for its effect to block valve $L_2$ of amplifier $R_2$ $(Bg)_2$. The conversation current of subscriber O received at $a_2$ $b_2$ cannot therefore return toward $a_1$ $b_1$, since the return path through amplifier $R_2$ is blocked.

When subscriber E is talking, the working of the system is identical.

It should be noted that systems $(La)_1$ and $(La)_2$ need not be determined in as accurate a manner as the balancing devices employed up to this time in telephonic lines. Furthermore, they can easily be adjusted in such manner as to vary the action of the control, which is also influenced by the adjustment of points $s_1$, $s'_1$, $s'_2$, $s_2$, taken on the corresponding resistances.

Of course, it is possible, without departing from the principle of the present invention, to introduce into the circuits any known devices performing well determined and known functions, such for instance as filters and potentiometers, transformers with multiple terminals, etc. It is even possible to multiply eventually the amplification stages by making use of all known coupling methods.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. In connection with a system including a transformer having a primary and a secondary, a circuit for said secondary, and a thermionic tube inserted in said circuit, a control device which comprises, in combination, unidirectional conduction means inserted in said circuit in shunt with said tube, two direct current sources, one of a fixed electromotive force and the other of a variable electromotive force, inserted in series in said circuit in such manner that the flow of current through said unidirectional conduction means depends upon the value of said variable electromotive force, a source of alternating potential, and means, operative by said alternating potential, for controlling said source of variable electromotive force, whereby the action of said tube is controlled through said alternating potential.

2. In connection with a system including a transformer having a primary and a secondary, a circuit for said secondary and a thermionic tube inserted in said circuit, a control device which comprises, in combination, unidirectional conduction means inserted in said circuit in shunt with said tube, a direct current source, of fixed electromotive force, inserted in said circuit, a resistance inserted in said circuit in series with said source, a thermionic tube having a grid circuit and an anode circuit, a source of alternating potential, and current rectifying means inserted between said source of alternating potential and said grid circuit, said anode circuit being connected in shunt with said resistance in such manner that the difference of potential produced across said resistance by current flowing through said anode circuit is in opposition with the electromotive force of said direct current source, whereby the flow of current through said unidirectional conduction means depends upon the working of said source of alternating tension and in turn controls the working of said first mentioned tube.

3. In connection with an amplifier including an input transformer having a primary and a secondary, a circuit for said secondary, and at least one amplifying tube having a grid and a cathode, said secondary circuit including the grid-cathode space of said valve, a device for controlling the amplification of said amplifier which comprises, in combination, unidirectional conduction means inserted in said circuit in shunt with said tube, two direct current sources, one of a fixed, and the other of a variable, electromotive force, inserted in series in said circuit in such manner that the flow of current through said unidirectional conduction means depends upon the value of said variable electromotive force, a source of alternating potential, and means, operative by said alternating potential, for controlling said source of variable electromotive force so as to bring it into or out of action, whereby the action of said tube is controlled through said alternating potential.

4. In connection with an amplifier including an input transformer having a primary and a secondary, a circuit for said secondary, and at least one amplifying tube having a grid and a cathode, said secondary circuit including the grid-cathode space of said valve, a device for controlling the amplification of said amplifier which comprises, in combination, unidirectional conduction means inserted in said circuit in shunt with said tube, two direct current sources, one of a fixed, and the other of a variable, electromotive force, inserted in series in said circuit in such manner that the flow of current through said unidirectional conduction means depends upon the value of said variable electromotive force, a grid polarization battery connected with said secondary circuit in opposition with the source of fixed direct current and of an electromotive force lower than that of said fixed source, a source of alternating potential, and means, operative by said alternating potential, for controlling said source of variable electromotive force so as to bring it into or out of action, whereby the action of said tube is controlled through said alternating potential.

5. In connection with an amplifier including an input transformer having a primary and a secondary, a circuit for said secondary, and at least one amplifying tube having a grid and a cathode, said secondary circuit including the grid-cathode space of said valve, a device for controlling the amplification of said amplifier which comprises, in combination, unidirectional conduction means inserted in said secondary circuit in shunt with said tube, a direct current source, of fixed electromotive force, inserted in said circuit, a resistance inserted in said circuit in series with said source, a thermionic tube having a grid circuit and an anode circuit, a source of alternating potential, and current rectifying means inserted between said source of alternating potential and said last mentioned grid circuit, said anode circuit being connected in shunt with said resistance in such manner that the difference of potential produced across said resistance by current flowing through said anode circuit is in opposition with the electromotive force of said direct current source, whereby the flow of current through said unidirectional conduction means depends upon the working of said source of alternating potential and in turn controls the amplification of said amplifier.

6. In connection with an amplifier including an input transformer having a primary and a secondary, a circuit for said secondary, and at least one amplifying tube having a grid and a cathode, said secondary circuit including the grid-cathode space of said valve, a device for controlling the amplification of said amplifier which comprises, in combination, unidirectional conduction means inserted in said secondary circuit in shunt with said tube, a direct current source, of fixed electromotive force, inserted in said circuit, a grid polarization battery inserted in said circuit in opposition with said source of direct current and of an electromotive force lower than that of said source, a resistance inserted in said circuit in series with said source, a thermionic tube having a grid circuit and an anode circuit, a source of alternating potential, and current rectifying means inserted between said source of alternating potential and said grid circuit, said anode circuit being connected in shunt with said resistance in such manner that the difference of potential produced across said resistance by current flowing through said anode circuit is in opposition with the electromotive force of said direct current source, whereby the flow of current through said unidirectional conduction means depends upon the working of said source of alternating potential and in turn controls the amplification of said amplifier.

7. In a telephonic system including a transmission line, a four-wire circuit inserted in said line, and a transformer in one one-way path of said circuit having a primary and a secondary, a circuit for said secondary, and a thermionic tube inserted in said secondary circuit, a control device which comprises, in combination, unidirectional conduction means inserted in said secondary circuit in shunt with said tube, a direct current source of fixed electromotive force inserted in said secondary circuit, a resistance inserted in said secondary circuit in series with said source, and means, connected with the other one-way path of said four-wire circuit in shunt with said transformer and operative by current from said line, for producing across said resistance a difference of potential in opposition with the electromotive force of said direct current source.

8. In a telephonic system including a two-wire transmission line, a four-wire circuit inserted in said line, a transformer in one one-way path of said four-wire circuit having a primary and a secondary, a circuit for said secondary and a thermionic tube inserted in said secondary circuit, a control device which comprises, in combination unidirectional conduction means inserted in said secondary circuit in shunt with said tube, a direct current source of fixed electromotive force inserted in said secondary circuit in such manner as to block said tube, a passive system of impedances with four terminals, inserted in the other one-way path of said four-wire circuit, two rectifiers connected to said last mentioned one-way path on either side of said passive system respectively, two multi-electrode tubes having their respective grids connected with said rectifiers for polarization thereof and two potentiometers arranged to be fed with current from said last mentioned tubes, respectively, mounted in opposition with each other, said potentiometers being inserted in the secondary circuit of said transformer in series with said source of direct current, in such manner that a conversation current transmitted through said telephonic line produces through these two potentiometers a difference of potential in opposition with the electromotive force of said direct current source which disengages said first mentioned tube.

CAMILLE RAVUT.
LOUIS GODEAU.